United States Patent [19]

Jacobs et al.

[11] 4,108,968

[45] Aug. 22, 1978

[54] CONTROL OF PURITY AND PARTICLE SIZE IN PRODUCTION OF ALUMINUM CHLORIDE

[75] Inventors: Stanley C. Jacobs, Lower Burrell, Pa.; Larry K. King, Maryville, Tenn.; Bernard J. Racunas, New Kensington, Pa.

[73] Assignee: Aluminum Company of America, Pittsburgh, Pa.

[21] Appl. No.: 817,822

[22] Filed: Jul. 21, 1977

Related U.S. Application Data

[63] Continuation-in-part of Ser. No. 765,458, Feb. 3, 1977, abandoned.

[51] Int. Cl.² ............................................. C01F 7/58
[52] U.S. Cl. ......................... 423/495; 423/DIG. 16; 204/67
[58] Field of Search ................ 423/495, 496, DIG. 16

[56] References Cited

U.S. PATENT DOCUMENTS 3,786,135  1/1974  King et al. ............................ 423/496

*Primary Examiner*—Edward Stern
*Attorney, Agent, or Firm*—John P. Taylor

[57] ABSTRACT

In the production of aluminum chloride suitable for subsequent electrolytic reduction to metallic aluminum control of both the purity and the particle size is achieved by control of the entrance velocity of the aluminum chloride vapors in a fluidized bed, control of the fluidized bed temperature, and selective removal of the condensed particles from the bottom of the fluidized bed.

3 Claims, 1 Drawing Figure

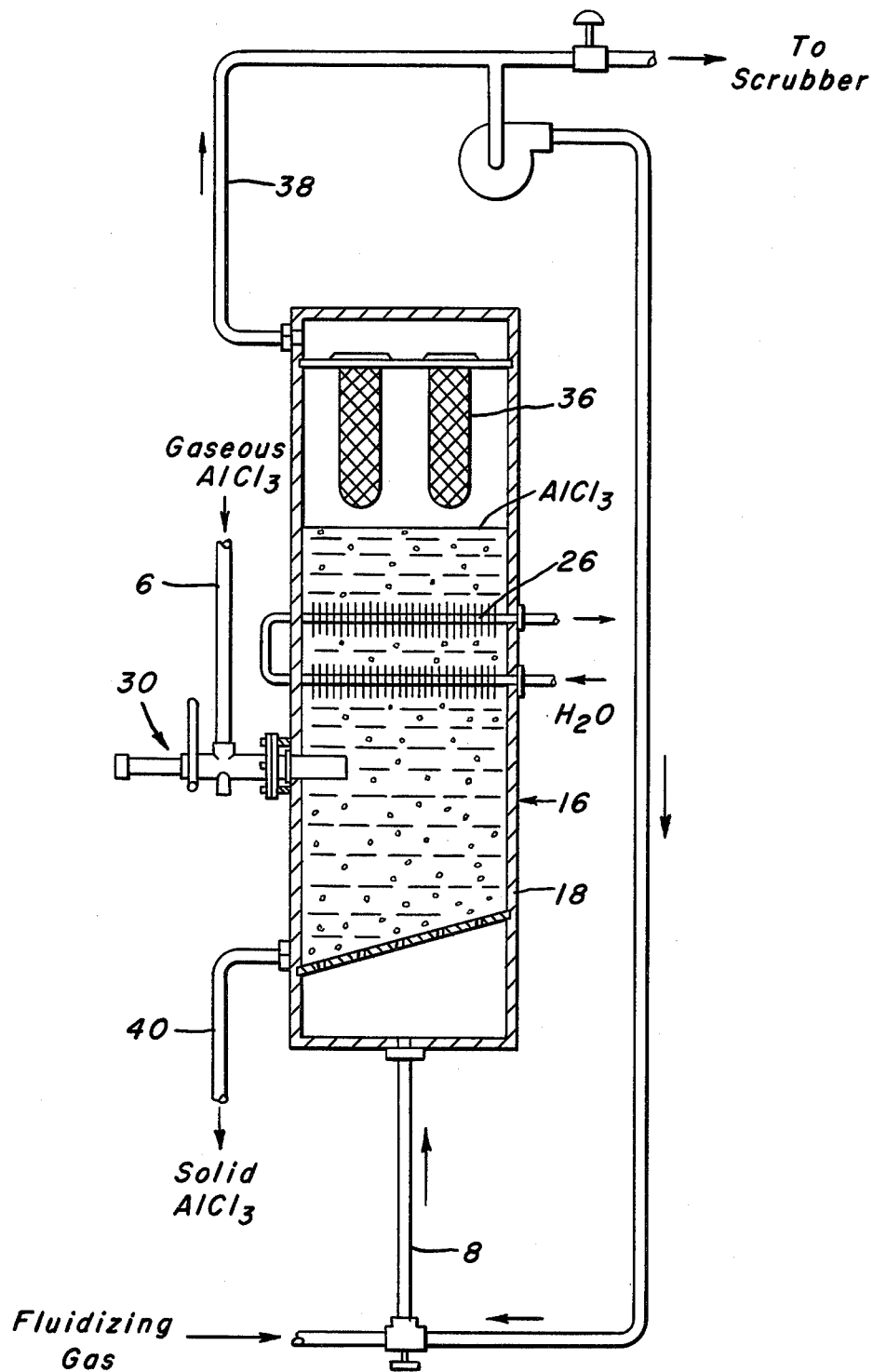

CONTROL OF PURITY AND PARTICLE SIZE IN PRODUCTION OF ALUMINUM CHLORIDE

CROSS REFERENCE TO RELATED APPLICATIONS

This application is a continuation-in-part of Stanley C. Jacobs et al. U.S. Ser. No. 765,458, filed Feb. 3, 1977 and now abandoned.

BACKGROUND OF THE INVENTION THE INVENTION

This invention relates to the production of aluminum chloride. More particularly, this invention relates to an improved process for the control of particle size and purity of aluminum chloride.

In the production of aluminum chloride suitable for subsequent electrolytic reduction to metallic aluminum by the chlorination of materials containing compounds of aluminum as well as other materials such as silicon, titanium, and iron, the resulting chlorides must be separated to provide a sufficiently high purity aluminum chloride for the subsequent electrolytic process to perform in a satisfactory manner. In King et al. U.S. Pat. No. 3,786,135 there is disclosed and claimed a process for the recovery of high purity aluminum chloride from the gaseous effluent of chlorination of aluminum compounds which involves a first step of initially cooling the hot gaseous effluent sufficiently to selectively condense sodium aluminum chloride and other high melting point chloride values therefrom and separating such initially condensed values as well as entrained particles from the gaseous effluent followed by a further cooling of the gaseous effluent to a second and lower predetermined temperature range to condense a high proportion of the remaining volatile constituents that are condensable above the condensation temperature of aluminum chloride. The final step claimed in that process relates to the direct desublimation of high purity aluminum chloride values in a fluidized bed of aluminum chloride at a temperature range of from about 30°-100° C. It is in the area of this third step that the refinements comprising the process of this invention are directed.

In the aforesaid patent there is illustrated a fluidized bed containing fluidized particles of aluminum chloride into which the vapors are passed at an undisclosed velocity. The vapors are said to pass through the fluidized bed at a temperature of about 30°-100° C to provide condensation of the vapors on the solid aluminum chloride particles. Filters above the fluidized bed prevent the loss of particles, particularly very fine particles, from the condenser. Provision is illustrated for removal of the solid aluminum chloride from a position adjacent the bottom of the condenser. As mentioned above, the operating temperature within the condenser is stated to be from 30°-100° C, suitably within about 60°-90° C and preferably within the narrower range of 50°-70° C. The patentees go on to describe the effect on particle size of the condensation temperature noting that at lower temperatures within the specified range of 30°-100° C the average particle size of the condensed product is generally smaller. The patentees further note that even within the range of 30°-100° C, a certain amount of the gaseous aluminum chloride values will not desublime. They, therefore, indicate the desirability of using condensation temperatures at the lower end of the stated range of 30°-100° C.

While operation of the condensation process at the lower end of the range as taught in the King et al. patent does result in a satisfactory particle size as well as an economically attractive yield of aluminum chloride, it has been found that such operation can lead to undesirable condensation of the by-products such as titanium tetrachloride. Furthermore, since the filing of the aforementioned King et al. patent in 1971, more has been learned as to the operating conditions within the fluidized bed during condensation.

While it would appear that simply raising the temperature of the condensation would eliminate the contamination problem, it has been discovered that other operating parameters, particularly entrance velocity, must also be controlled.

Thus, while two of us have described and claimed a process for controlling impurities using a first high temperature fluidized bed followed by a second lower temperature fluidized bed in patent application Ser. No. 765,459, entitled "Method of Producing High Purity Aluminum Chloride", filed Feb. 3, 1977, we have discovered that not only control of temperature is important but control of the entrance velocity and the method of removal of the condensed aluminum chloride must be considered whether operating with one or two fluidized beds.

SUMMARY OF THE INVENTION

It is therefore an object of this invention to provide improvements in the process for condensation of aluminum chloride having a purity and particle size suitable for subsequent electrolytic reduction to metallic aluminum.

In accordance with the invention, improvements for the process for the production of aluminum chloride in a fluidized bed comprise passing gaseous aluminum chloride into the fluidized bed of aluminum particles at an entrance velocity of from 18 meters/sec to 90 meters/sec; condensing the aluminum chloride vapors in the bed while maintaining the fluidized bed at a temperature of 60°-80° C; and removing the condensed particles of aluminum chloride from a point adjacent the bottom of the fluidized bed thereby providing particles of aluminum chloride having a particle size range of 1-500 microns and a purity of at least 99.5%.

BRIEF DESCRIPTION OF THE DRAWING

The sole drawing of the invention is a vertical cross section of a condensation apparatus operated in accordance with the invention.

DESCRIPTION OF THE INVENTION

Referring now to the FIGURE, aluminum chloride vapors which have been previously processed through initial purification means such as the first two stages of purification described in the aforesaid King et al., U.S. Pat. No. 3,786,135 enter condensation chamber 18 via line 6 and inlet 30. The inlet 30 for the gaseous aluminum chloride-containing gas is desirably provided with means to maintain the temperature of the incoming gas at an elevated value such as for example auxiliary heating means and/or insulation means such as quartz, alumina, graphite, asbestos, and the like, at the entrance thereof to minimize, if not prevent, premature cooling and liquefaction or solidification of the gaseous aluminum chloride passing therethrough which would tend to clog the same to impede or otherwise deleteriously affect the desired condensation or desublimation operation.

Because of the need to avoid premature condensation of the gaseous aluminum chloride at locations other than in the fluidized bed itself considering the ambient conditions, the entrance of inlet 30 desirably projects appreciably into the bed and terminates remote from all structural surfaces therewith including the walls of the chamber and cooling means 26 located within the chamber.

The gas is introduced into condensation chamber 18 to condense or desublime on the fluidized particles comprising fluidized bed 16. Fluidized bed 16 comprises aluminum chloride particles having a particle size range of from 1 to 500 microns which are fluidized by a fluidizing gas which enters chamber 18 through line 8. "Desublimation" and "desublime" as utilized herein refer to the direct formation of solid aluminum chloride from the gaseous phase without any noticeable formation of an intermediate liquid phase while "condensation" and "condense" are intended to embrace change from the gaseous phase to either the liquid or solid phase.

In accordance with one aspect of the invention, purity of the aluminum chloride product is maintained at 99.5% or higher by operating the bed at a temperature of from 60°–80° C. The temperature in fluidized bed 16 is maintained at from 60°–80° C via cooling coils 26 through which water is run at a temperature sufficiently low to maintain the bed at this temperature. While this elevated temperature does result in a larger particle size, as alluded to in King et al. U.S. Pat. No. 3,786,135 the use of bottom draining as well as a higher entrance velocity (as will be described below) result in a particle size range useable in subsequent electrolytic reduction cells. Higher bed temperatures (even above 80° C) still result in a useful particle size. It should be further noted that the upper limit of the temperature range of the bed is not, therefore, to maintain correct particle size but rather to minimize aluminum chloride losses which would occur at higher temperatures.

In accordance with another aspect of the invention, particle size control is also maintained by periodic removal of aluminum chloride particles via exit port 40 located adjacent the bottom of fluidized bed 16. By periodic is meant removal of 5 to 20% of the bed every hour. It is important to the practice of the invention that the particle removal be carried out adjacent the bottom of the bed to insure that the largest particles (which also are difficult to fluidize) will be removed. By the term ". . . adjacent the bottom . . ." is meant location either at the bottom of the fluidized bed of particles or in the lowest 10% of the bed height to insure large particle removal as discussed.

In accordance with the invention, the aluminum chloride vapors at a temperature of about 250° C enter the bed at a recommended minimum velocity of 18 and up to 90 meters/sec. While we do not wish to be bound by any theory of operation, this entrance velocity provides for adequate mixture of the hot vapors with the cool fluidized particles which is thought to provide a condensation zone in the bed adjacent the nozzle.

This apparent condensation zone is thought to account for the discovery that the particle size can be at least partially controlled by changes in entrance velocity while still maintaining the fluidized bed at the recited 60°–80° range. It is thought that an increase in velocity may inject the 250° C aluminum chloride vapors deeper into the bed (which is maintained at the 60°–80° range by cooling coils or water spray or the like) thus perhaps creating an apparent lowering of the condensation zone temperature. These postulations are based on the observed fact that increases in velocity (without any change in the bed temperature) result in lowering of the particle size.

This control of particle size via velocity control as well as bed temperature control thus results in control and lowering of the particle size without further lowering of the overall bed temperature which would otherwise cause greater amounts of $TiCl_4$ to also condense which would adversely affect the purity of the $AlCl_3$ product.

Thus the aluminum chloride vapors entering the bed are condensed on the particles and the remaining vapors of other impurities such as, for example, titanium chloride, or the like, pass out to the top of the bed via line 38. Some of these gases are recirculated back to line 8 to be reused as fluidized gas while the remaining gas passes off to the scrubber. Passage of the solid aluminum chloride particles through line 38 is restrained by the filters 36 which remove or recapture all solid particles.

To further illustrate the invention, $AlCl_3$ vapors were passed through a fluidized bed initially containing 50 grams of aluminum chloride particles at an entrance velocity of about 90 meters/sec while maintaining the bed temperature at between 60°–80° C. Three 10-gram samples were removed each hour. The particle size and purity were analyzed. The particle size averaged about 300 microns. The purity was over 99.5% by weight; and the titanium tetrachloride content was less than 0.008% by weight.

What is claimed is:

1. In the process for the production of aluminum chloride having a particle size range and purity suitable for subsequent electrolytic reduction to metallic aluminum by the chlorination of a material containing a compound of aluminum wherein other chlorides are also formed which must be separated from the aluminum chloride prior to said electrolytic reduction, the improvement in purity control and particle size control which comprises:
   (a) passing gaseous aluminum chloride at a temperature of about 250° C into a fluidized bed of aluminum chloride particles at an entrance velocity of from 18 meters/second to 90 meters/second;
   (b) condensing aluminum chloride in the fluidized bed at a temperature of 60°–80° C; and
   (c) removing particles of condensed aluminum chloride from a point adjacent the bottom of the fluidized bed thereby providing particles of aluminum chlorides characterized by a particle size range of 1–500 microns, a purity of at least 99.5% by weight, and a $TiCl_4$ content of less than 0.008% by weight.

2. The process of claim 1 wherein from 5–20% by weight of the bed is removed each hour.

3. In the process for the production of aluminum chloride having a particle size range of 1–500 microns and a purity of at least 99.5% by weight including a titanium tetrachloride content of less than 0.008% by weight to render the aluminum chloride particles suitable for subsequent electrolytic reduction to metallic aluminum by the chlorination of a material containing a compound of aluminum wherein other chlorides are also formed which must be separated from the aluminum chloride prior to said electrolytic reduction, the improvement in purity control and particle size control which comprises:
(a) passing gaseous aluminum chloride at a temperature of about 250° C into a fluidized bed of aluminum chloride particles at an entrance velocity of from 18 to 90 meters/second;
(b) condensing aluminum chloride in the fluidized bed at a temperature of 60°–80° C; and
(c) controlling the size of the solid particles of aluminum chloride within the fluidized bed during condensation to prevent growth of the particles larger than 500 microns.

* * * * *